United States Patent
Venkatesh

(10) Patent No.: US 10,067,891 B2
(45) Date of Patent: Sep. 4, 2018

(54) SYSTEM AND METHOD FOR USB REDIRECTION FOR CONFERENCING IN AN ENTERPRISE

(71) Applicant: Dell Products L.P., Round Rock, TX (US)

(72) Inventor: Ramanujam Kaniyar Venkatesh, Bangalore (IN)

(73) Assignee: Dell Products L.P., Round Rock, TX (US)

(*) Notice: Subject to any disclaimer, the term of this patent is extended or adjusted under 35 U.S.C. 154(b) by 283 days.

(21) Appl. No.: 14/885,128

(22) Filed: Oct. 16, 2015

(65) Prior Publication Data
US 2017/0109301 A1 Apr. 20, 2017

(51) Int. Cl.
*G06F 13/20* (2006.01)
*G06F 13/40* (2006.01)
*G06F 13/42* (2006.01)

(52) U.S. Cl.
CPC .......... *G06F 13/20* (2013.01); *G06F 13/4068* (2013.01); *G06F 13/4282* (2013.01)

(58) Field of Classification Search
CPC .. G06F 13/20; G06F 13/4068; G06F 13/4282; G06F 3/4068
See application file for complete search history.

(56) References Cited

U.S. PATENT DOCUMENTS

| | | | |
|---|---|---|---|
| 8,010,630 B2 | 8/2011 | Barreto et al. | |
| 2007/0233869 A1* | 10/2007 | Jodh | H04L 63/10 709/226 |
| 2009/0150909 A1* | 6/2009 | Barreto | G06F 9/4411 719/324 |
| 2010/0246448 A1* | 9/2010 | Krantz | H04L 12/1818 370/260 |
| 2012/0158822 A1* | 6/2012 | Dai | G06F 9/54 709/203 |
| 2013/0111561 A1* | 5/2013 | Kaushik | H04L 63/105 726/4 |

* cited by examiner

*Primary Examiner* — Tim T Vo
*Assistant Examiner* — Herve Iradukunda
(74) *Attorney, Agent, or Firm* — Baker Botts L.L.P.

(57) ABSTRACT

In certain information handling system environments, users may collaborate or communicate via remote conferencing software. In some instances an attendee may request that a selected universal serial bus (USB) device associated with another attendee be redirected such that the content of the selected USB device may be available to one or more attendees or that content may be communicated to the selected USB device. The server may receive requests associated with a selected USB device and redirect those requests to the selected USB device. The selected USB device may only be redirected to a selection of the one or more attendees based on one or more parameters associated with the one or more attendees.

20 Claims, 7 Drawing Sheets

__US 10,067,891 B2__

SYSTEM AND METHOD FOR USB REDIRECTION FOR CONFERENCING IN AN ENTERPRISE

TECHNICAL FIELD

This disclosure generally relates to redirection of universal serial bus (USB) devices, and in particular to USB device redirection for conferencing in an enterprise network.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

Conferencing software that permits remote users to communicate with one another may be hosted on a cloud desktop of a VDI and remote desktop session host (RDSH) infrastructure. Unified computing systems such as Cisco Unified Computing System (UCS) and Microsoft Lync, CITRIX GoToMeeting, Avaya IP office, Alcatel Open-Touch, and others along with web conferencing software such as TeamViewer, CISCO WEBEX, GoToAssist, LogMeIn, BOMGAR, N24 and others provide users with a way to interact with each other over an enterprise network. For example, users remote from each other may collaborate for online meetings, presentations, training sessions, etc.

For some online collaborations, users may want to share big data, for example, a virtual machine image, images, a video file, an audio file, database, data file, etc. instantly or without too much of a delay. However, conferencing software may limit the data transfer size and may not allow data to be shared instantly. The present disclosure addresses this issue.

SUMMARY

According to one or more embodiments of the present disclosure, a method comprises receiving a virtualization request to virtualize a universal serial bus (USB) device from a client. A virtual USB device is created that correspond to or is associated with the USB device. A conference is initiated via a conferencing application and the conference may be joined by any one or more attendees. The conference may be hosted by a host and the host may also be an attendee. A redirection request is received from the application and redirection request may comprise information associated with a selected virtual USB device. The selected virtual USB is any one of the created virtual USB devices. A notification is sent to an agent that comprises a request for redirection of the selected virtual USB device. The redirection request is sent to the client associated with the USB device associated with the selected virtual USB device. A response from the client is received, wherein the response is indicative of a status of the USB device associated with the selected virtual USB device. The selected virtual USB device is redirected to one or more clients associated with the one or more attendees based, at least in part, on the response.

In one embodiment the redirection request comprises identification of one or more selected attendees. Also, the response to the redirection request may indicate one or more attendees that have access to the USB device associated with the selected virtual USB device.

In one embodiment, the method further comprises receiving content from at least one of the one or more attendees and storing the content received on or at the selected virtual USB device. The method may also further comprise collecting content from at least one of the one or more attendees and communicating the content collected to a selection of the one or more attendees. The selection of the one or more attendees may be made by a host based, at least in part, on one or more parameters, and the one or more parameters may comprise permissions associated with the one or more attendees.

In one or more embodiments, a system comprises a server, one or more central processing units for processing information of the server, a memory of the server communicatively coupled to the one or more central processing units, and one or more modules that comprise instructions, when executed by the one or more processing units, that are operable to perform operations comprising any of the one or more embodiments of the present disclosure.

In one or more embodiments, one or more computer-readable non-transitory storage media embodying software operable when executed by one or more computer systems perform any one or more of the embodiments of the present disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

Figure 1:
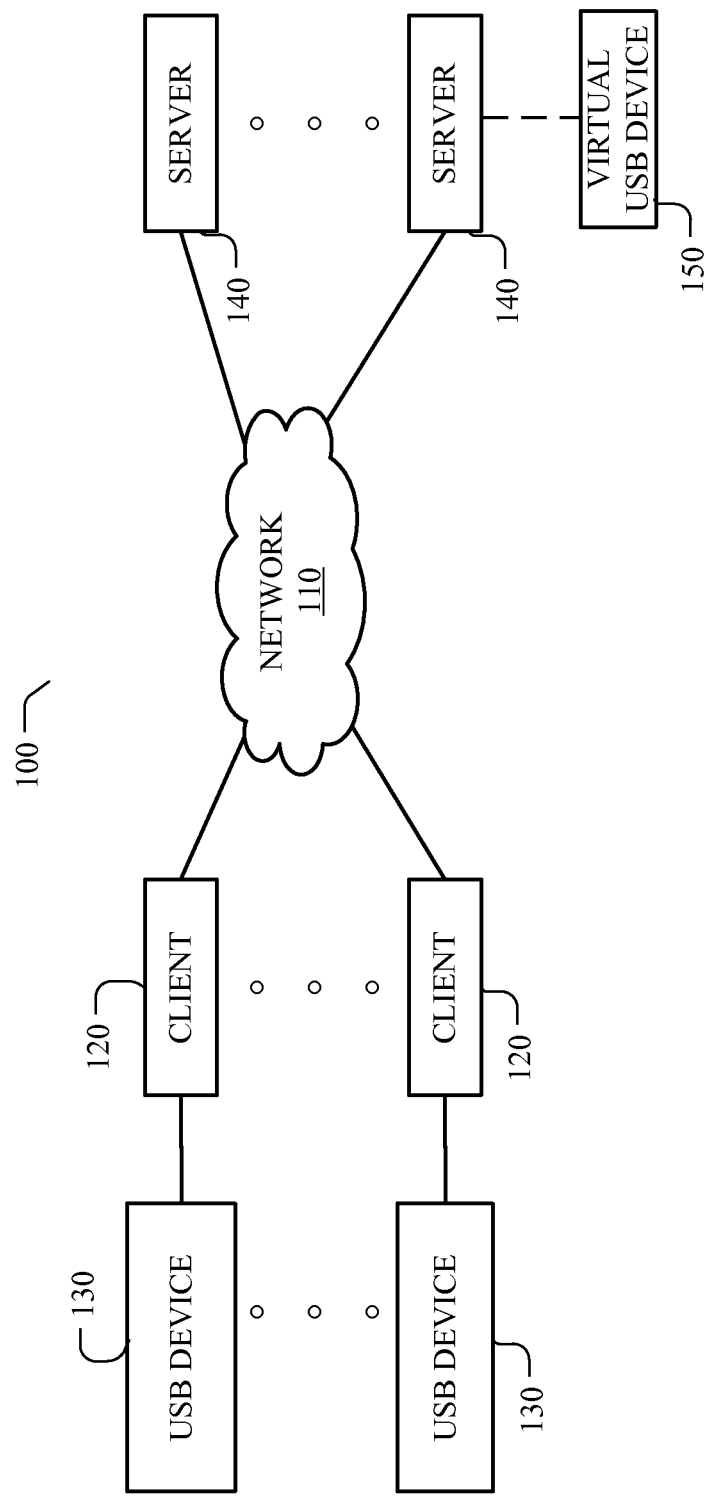
FIG. 1 illustrates an example configuration of networked information handling systems according to one embodiment of the present disclosure.

This disclosure generally relates to remote computing and, in particular, relates to providing access to a specific attendee's (universal serial bus) USB device to one or more other attendees of a conference. For example, a host may initiate a conference at a server. One or more attendees may join the conference. In one or more embodiments, a host may also be an attendee. One attendee may couple a USB device locally at a client. Remote desktop protocols (RDP) may allow redirection of USB devices at a server, for example, the locally coupled USB device. In one embodiment, the host may want to share content located on a USB device local to the host's information handling system (such as a server). The host may redirect the USB device to any one or more clients associated with the one or more attendees. For example, the host may select certain attendees, one attendee, or all attendees to have access to certain content and may redirect the USB device to the one or more clients associated with only those selected attendees. The host may remove the USB device after the content has been presented to, accessed by or copied by the one or more clients associated with the one or more attendees.

In another embodiment, the present invention provides one or more attendees of a conference with access to a virtualized USB device. The one or more attendees may request, the host of the conference may request, or the attendee associated with the USB device may request that a selected USB device or a selected USB device associated with a virtualized USB device be redirected to any one or more of the clients associated with any one or more of the attendees such that stored content of the selected USB device may be presented to, accessed by, or copied to one or more of the attendees. In another embodiment, any of the one or more attendees may request that content be communicated to a selected USB device that has been redirected. For example, attendee "A" may wish to copy certain content so that it may be accessible by any one or more or selected attendees. Attendee "A", the host, or another attendee (for example, the attendee associated with the selected USB device) may request redirection of a selected USB device to attendee "A" so that attendee "A" may copy the content to the redirected USB device.

The present invention discloses systems and methods for providing content between one or more attendees and a host without the necessity of copying content to a medium and then physically transporting that medium to the requesting attendees or host.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

A user may access devices redirected to the server as if those devices are available locally to the user by connecting all the necessary peripherals. For example, the user may connect to any number of USB devices such as USB pen drives, USB printers, USB scanners, USB facsimiles, USB mass storage devices, and any other device known to one of ordinary skill in the art.

According to the present disclosure, individual interfaces associated with a single physical device may be installed locally or may be redirected to another information handling device, such as a server. Interfaces forwarded to the server may be mounted as virtual devices at the server and may be shared with additional information handling systems. In some embodiments, one interface associated with a composite device may be redirected to one server, a second interface may be redirected to a second server, and a third interface may be installed locally.

As an example, if a USB device is connected to a given client via a standard USB connection, the locally connected USB device may be redirected to a server. The redirected USB device may then be installed locally for use by any number of clients. The server treats the USB device as a virtual device attached to the server.

FIG. 1 at 100 illustrates an example configuration of a networked information handling system. In particular embodiments, one or more client devices 120 and one or more servers 140 are connected via network 110. Clients 120 may be thin-clients, WebEx clients, or any other type of information handling system as described with respect to FIG. 6. Many types of peripheral devices may be connected locally to the client 120. As shown in FIG. 1, in some embodiments, one or more USB devices 130 connect to client 120. According to the present disclosure, one or more USB devices 130 may appear to one or more of servers 140 as if they are locally installed on and connected to those servers 140. In certain embodiments, these USB devices 130 may be redirected such that they appear to be locally installed or locally shared with another client 120. In one embodiment, the Dell Wyse TCX USB Virtualization is used to virtualize the USB device 130. In one or more embodiments, one or more USB devices 130 may be virtualized (a virtual USB device 150) at a server 140.

Figure 2:
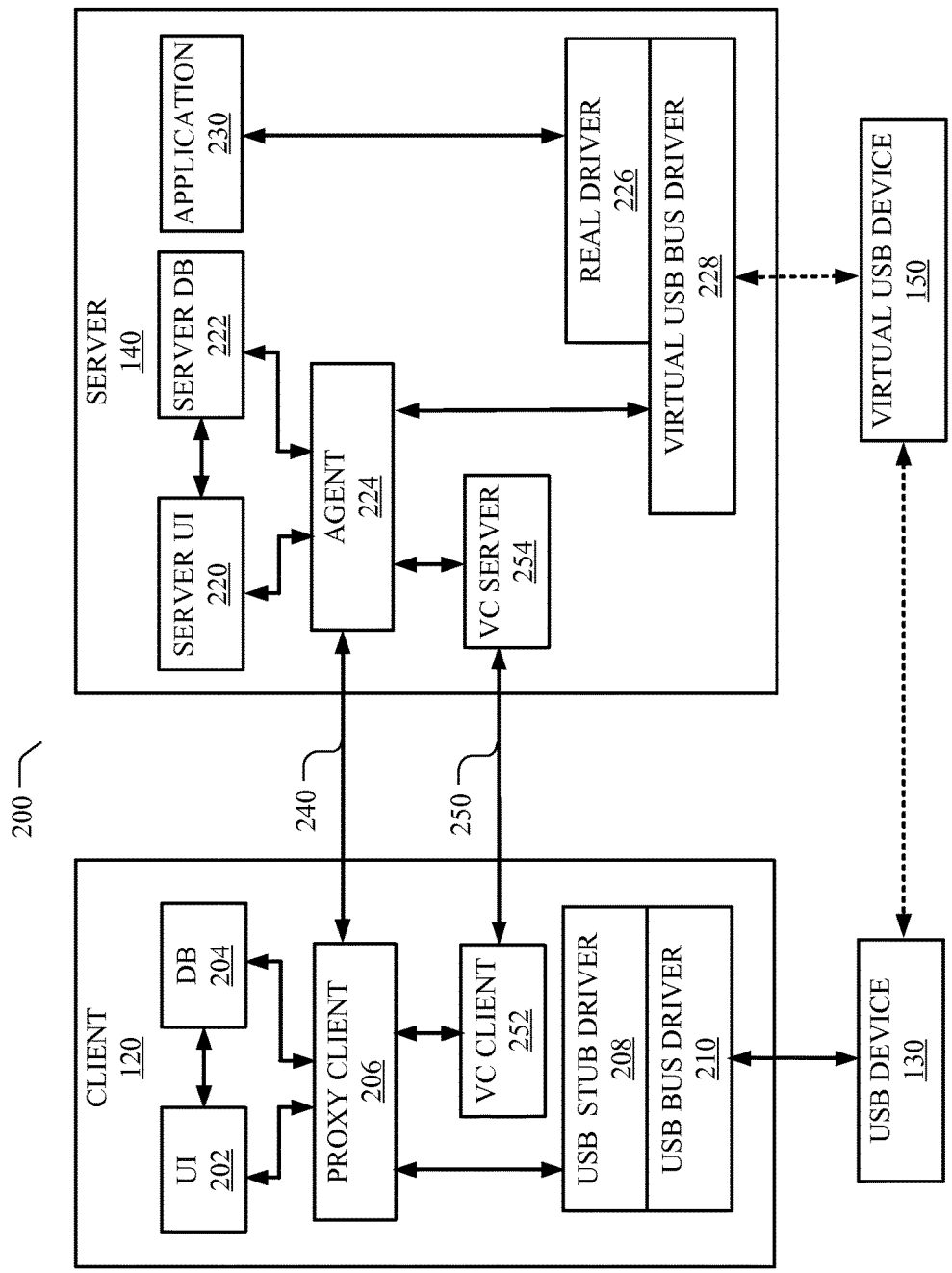
FIG. 2 illustrates an example system of a networked client and server according to one embodiment of the present disclosure.

FIG. 2 at 200 illustrates an example embodiment of a system configured to redirect a USB device 130 to allow for remote conferencing in an enterprise environment. In a particular embodiment, the configuration shown in FIG. 2 illustrates a virtual environment that may include one or more of Virtual Desktop Infrastructure (VDI) environment, Server-Based Computing (SBC) environment, and application virtualization technologies. This disclosure contemplates any number of virtual environments as known to one of ordinary skill in the art. As a result of the suitability of these technologies for different user types, many organizations are choosing to implement a hybrid approach that uses each of the technologies including using multiple vendors within each technology. The decision as to which users to allocate to which technology type may be difficult in advance of any actual implementation of a particular technology for a particular user.

Client 200 may include a user interface (UI) 202, database (DB) 204, proxy client 206, virtual channel (VC) client 252, USB stub driver 208, and USB bus driver 210. UI 202 may be within client 120 or may be a UI device 202 coupled to client 120 via any type of connection known to one or ordinary skill in the art. UI 202 is a device for displaying or playing content to a user, for example, an attendee or host of a conference. For example, in one embodiment UI 202 may be a monitor, a display-port monitor, a television, a projector, another client 120 or any other type of device known to one of ordinary skill in the art.

Client 120 may recognize USB device 130, which is connected locally. The client 120 loads the USB bus driver 210. The USB bus driver 210 manages the USB device 130 and converts any generic read and write requests to the appropriate USB request block (URB). The USB bus driver 210 loads the USB stub driver 208. The USB stub driver 208 primarily manages the USB hubs and corresponding ports and enumerates any USB devices 130 connected to these ports. In one embodiment the USB stub driver 208 is a Wyse USB stub driver. USB stub driver 208 communicates to proxy client 206 a request regarding redirection of the USB device 130. If a USB device 130 is configured to be redirected to server 140, the redirection may operate generally as described in U.S. Pat. No. 8,010,630 to Barreto, et al., which is incorporated herein by reference.

UI 202 provides an interface to a user or attendee to make one or more selections. In one embodiment, the UI 202 may allow an attendee to select one or more other attendees (including the host) or even all attendees. For example, it may be requested that certain content be shared with one or more attendees and the UI 202 may allow an attendee or a host to select the one or more other attendees to share the content with. In one embodiment, the UI 202 allows an attendee to select a USB device 130 for redirection at server 140. UI 202 may allow a user or attendee to redirect an entire USB device 130 or a required interface of a composite USB device 130. The database (DB) 204 may include information related to one or more USB devices 130. For example, DB 204 may include one or more of information related to the session that a particular USB device 130 is redirected, information indicative of interfaces associated with one or more USB devices 130 that are kept local or any other information known to one of ordinary skill in the art.

Client 120 and server 140 may communicate via proxy client 206 and agent 224 over a network 210 (shown in FIG. 1) via a websocket 240. In one embodiment, a proxy client 206 on client 120 may coordinate communications between USB device 130 and agent 224 running on server 140. For example, proxy client 206 may be configured to receive socket connection information over websocket 240 from server 140 and initiate redirecting I/O transactions between USB device 130 and agent 224 via proxy client 206. Agent 224 may be configured to register with the OS of the client 120 to receive notification of an establishment of any remote connection. In one embodiment, client proxy 206 sends to agent 224 one or more parameters or information related to USB device 130 that may be used, at least in part, to initialize virtual USB device 150. For example, client proxy 206 may send to agent 224 the USB version, vendor type, device type, or any other parameter known to one of ordinary skill in the art.

Virtual USB bus driver 228 receives information about USB device 130 that is to be redirected from agent 224 of the server 140. In one embodiment, virtual USB bus driver 228 may be a Wyse virtual USB bus driver wvusbbus.sys. Virtual USB bus driver 214 calls real driver 226, associated with the virtual USB device 150, to complete the initialization of the virtual USB device 150 on server 140. The virtual USB device 150 associated with the USB device 130 then functions as if the USB device 130 was locally connected to server 140 (as indicated by the dashed line between USB device 130 and virtual USB device 150. A real driver 226 is loaded for each virtual USB device 150.

The virtual USB device 150 is then made available to an application 230 via real driver 226. Application 230 may be one or more applications that reside locally at the server 140 or may be one or more virtual applications. In one or more embodiments application 230 may be a web conferencing application and unified communications software (UCS) such as Cisco Unified Computing System (UCS), Microsoft Lync, CITRIX GoToMeeting, Avaya IP office, Alcatel OpenTouch, and others along with web conferencing software such as TeamViewer, CISCO WEBEX, GoToAssist, LogMeIn, BOMGAR, N24.

Server UI 220 manages the one or more devices that are connected to the one or more clients 120 that have been redirected to the server 140. The server UI 220 may prompt a user via a user interface or send a command to one or more applications 230 or other software for permission to create a virtual USB device 150 according to a redirection request or notification for USB device 130 received from the proxy client 206. For example, a host initiates a conference utilizing an application 230. One or more attendees may join the conference. The attendees may be local to the server or remote from the server. The host may want to present content to one or more of the attendees. The server UI 220 manages the handling of the request from the application 230 to store or copy the content or data to the actual USB device 130 at the respective client 120 that corresponds to the virtual USB device 150.

Server database (DB) 222 may store among other things information related to redirection of USB devices 130. For example, server DB 222 may store the one or more users or attendees that are permitted to redirect USB devices 130 at the server 140, the type of USB devices 130 that may be redirected at the server 140 (including, but not limited to, manufacturer identification, vendor identification, hardware identification, storage size, software identification, versioning information, etc.) the number of USB devices 130 that may be requested to be redirected at server 140 or any other information known to one of ordinary skill in the art, or any other information related to redirection of USB devices 130 at the server 140.

Virtual channel 250 may be established by unified communications system (UCS), web conferencing software, or any combination thereof. If the websocket 240 cannot be established, then any data or web conferencing/UCS traffic may be communicated over the virtual channel 250. The virtual channel 250 listens for any virtual channel requests from the VC client 252 to establish a connection to the VC server 254. Once this connection is established, the virtual channel 250 may be used by the VC client 252 and the VC server 254 to communicate data associated with a conference, such as a conference initiated by a host via an application 230 at server 140. Also, the VC client 252 may notify the proxy client 206 and the VC server 254 may notify the agent 224 that a conference has been established.

Figure 3A:
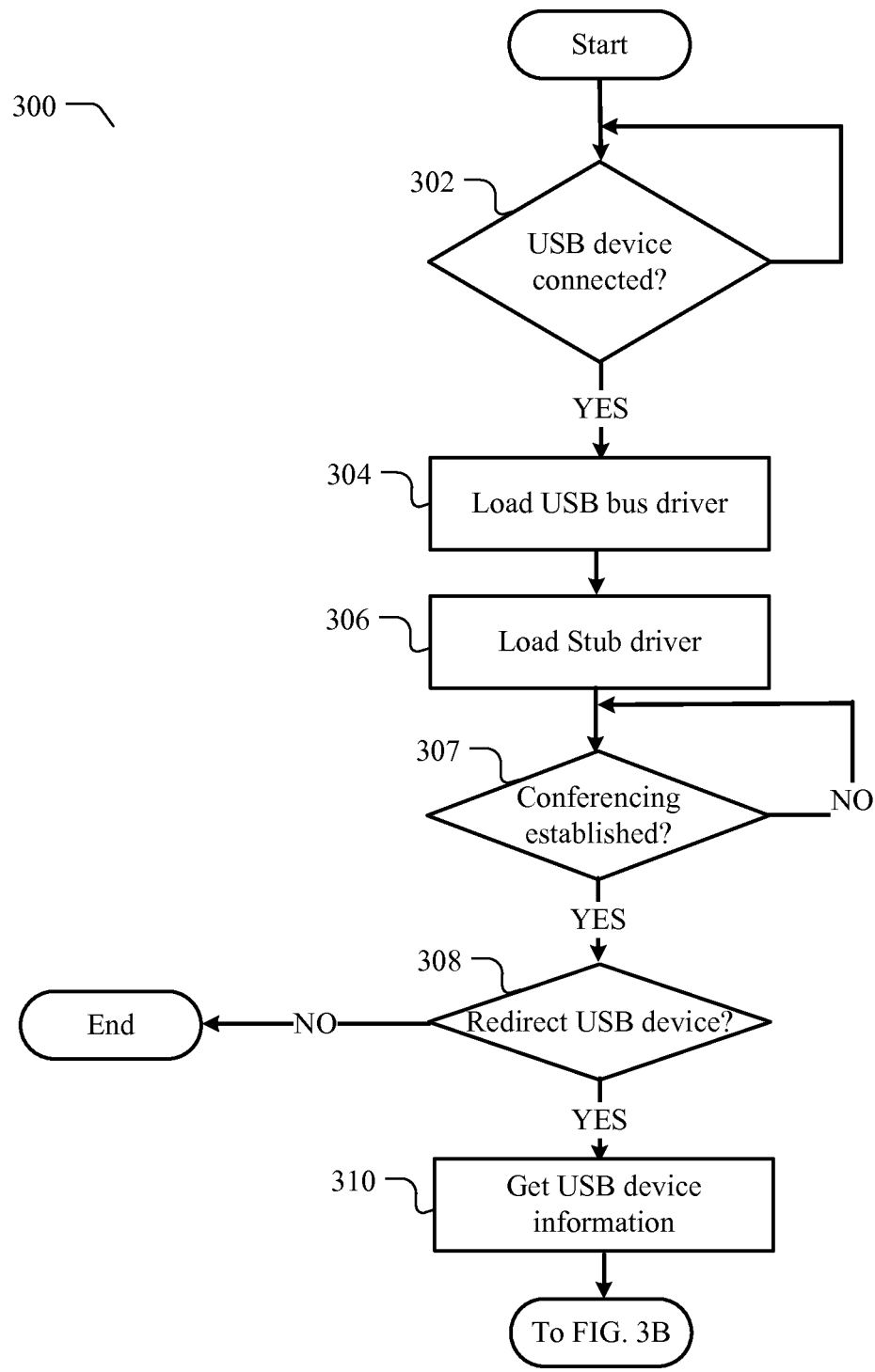
FIGS. 3A and 3B illustrate an example of steps involved in one method according to one embodiment of the present disclosure.
Figure 3B:
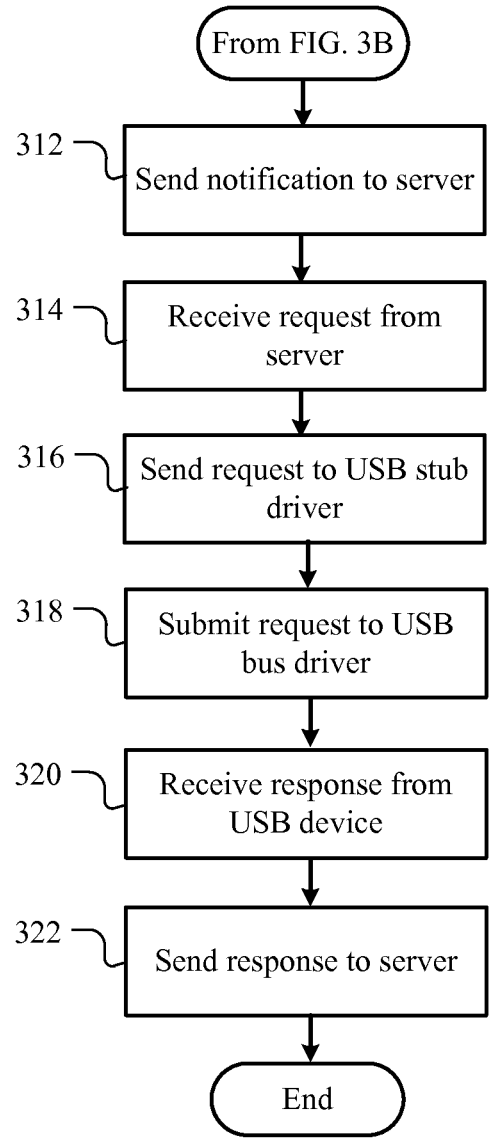

FIG. 3A and FIG. 3B are flow charts in accordance with an embodiment of the present disclosure, shown generally at 300, relating to preparation of the client 120 for redirection of a USB device 130 such that access to the content of USB device 130 that is requested to be presented to one or more attendees of a conference does not require physical delivery of the content or excessive network delays.

At step 302, the client 120, via proxy client 206, polls to determine if a USB device 130 is connected to client 120. In one embodiment, the proxy client 206 registers with the operating system (OS) at the client 120 for a device arrival notification of the type associated with the USB device 130. Proxy client 206 may determine if a USB device 130 is connected by any process known to one of ordinary skill in the art. For example, in one embodiment a user may use a graphical user interface (GUI) or a command line interface to inform the client 120 that a USB device 130 has been connected. In another embodiment, the client 120 may automatically detect without user intervention the connection of a USB device 130. USB device 130 may be any known USB device including, but not limited to, a USB mass storage device, a USB thumb drive, a USB hard disk drive, a USB printer, a USB facsimile machine, or any other USB device known to one of ordinary skill in the art that may be coupled to the client 120 via a USB. Client 120 may poll for a connection in any way known to one of ordinary skill in the art, based, at least in part, on an interrupt, a timer, a semaphore, execution of one or more modules comprising one or more instructions etc. that indicates connection of a USB device such as USB device 130. Once the USB device 130 is connected to the client 120, the OS of the client 120 will notify the proxy client 206 with the device type information.

If a USB device 130 is connected (either directly or communicatively) to the client 120, then at step 304, the client 120, via proxy client 206, loads a USB stub driver 208 associated with the USB device 130. At step 306, the USB stub driver 208 loads an associated bus driver 210.

Figure 6:
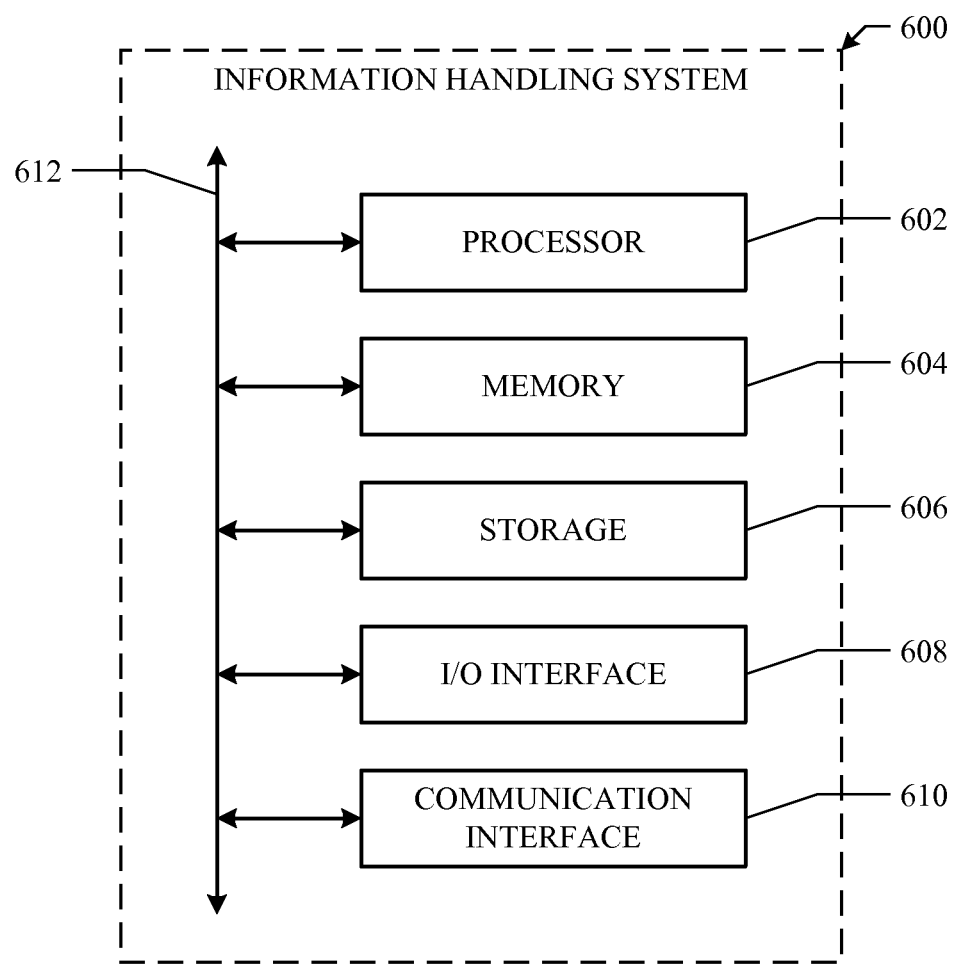
FIG. 6 illustrates an example computing system.

At step 307, the client 120 determines if a conference has been established between the client 120 and the server 140. While a connection to server 140 is discussed, the present disclosure contemplates any connection by client 120 to any conference hosted by any information handling system 600 as depicted in FIG. 6 including, but not limited to, one or more other clients 120. As discussed above with respect to FIG. 2 a conference may be initiated in any way known to one of ordinary skill in the art. For example, client 120 may communicate via an established virtual channel 250 to join a conference. In another example, server 140 may query client 120 to join a conference. The process at step 307 may continuously poll, wait for an interrupt or timed interval, be informed via conferencing software via an application programmer's interface (API) or any other execution of one or more modules comprising one or more instruction, or any other way known to one of ordinary skill in the art to determine if a conference has been established.

Once it is determined at step 307 that a conference has been established, at step 308 it is determined whether the USB device 130 should be redirected to the server 140. If it is determined not to redirect the USB device 130, the process may end. If it is determined to redirect the USB device 130 then at step 310, information indicative of one or more properties or characteristics of the USB device 130 are obtained. For example, the client 120 may query the USB device 130 for any one or more of vendor identification, product identification, manufacturer identification, version number of firmware and/or software, size (for example, amount of storage available for a USB mass storage device), or any other properties or parameters of USB device 130 known to one of ordinary skill in the art.

At step 312, the client 120 sends a notification to the server 140 that a USB device 130 needs to be redirected or that the user (or attendee) at client 120 requests for the USB device 130 to be redirected to the server 140 for use by a remote conferencing application or attendees of the conference. In one embodiment, the client 120 sends to the server 140 via the proxy client 206 and the agent 224 an arrival notification associated with the USB device 130 so that the server 140 can virtualize the USB device 130.

At step 314, the client proxy 206 of the client 120 receives a request (for example, a USB request block (URB)) from the agent 224 of the server 140. In one embodiment, the host of the conference via an application 230 requests that data associated with the virtual USB device 150 be shared with one or more attendees located at any one or more clients 120 and as such requests that the USB device 130 corresponding to the virtual USB device 150 be redirected to one or more selected attendees at one or more clients 120. In one embodiment, an attendee of the conference (or another user) requests that the server 140 redirect the virtual USB device 150 to any other attendee of the conference at any other client 120 so that any content or data associated with the corresponding USB device 130 may be shared. In one embodiment, the one or more attendees may be selected from a list of attendees stored locally at any of the one or more clients associated with the one or more attendees. In one embodiment, the host via one or more applications 230 may communicate the list of attendees to any one or more of the clients 120 associated with the any one or more of the attendees. In another embodiment, an attendee may request the list of attendees from the server 140. The selected attendees may be presented to an attendee via a GUI, a command line interface, or any other software application known to one of ordinary skill in the art and may be presented via UI 202.

At step 316, the request (or URB) directed to a USB device 130 (the USB device 130 corresponding to the virtual USB device 150) is sent from the client proxy 206 to the USB stub driver 208. The USB stub driver 208 at step 318 submits the request to the USB bus driver 210 associated with the USB device 130. At step 320, the USB device 130 responds to the proxy client 206 via the USB bus driver 210 and the stub driver 208 with the same URB as the request indicating that the data associated with the USB device 130 may be accessed. At step 322, the response is sent from the proxy client 206 to the agent 224 for the server 140 to redirect the virtual USB device 150 associated with the USB device 130 to the selected one or more attendees of the one or more clients 120.

Figure 4:
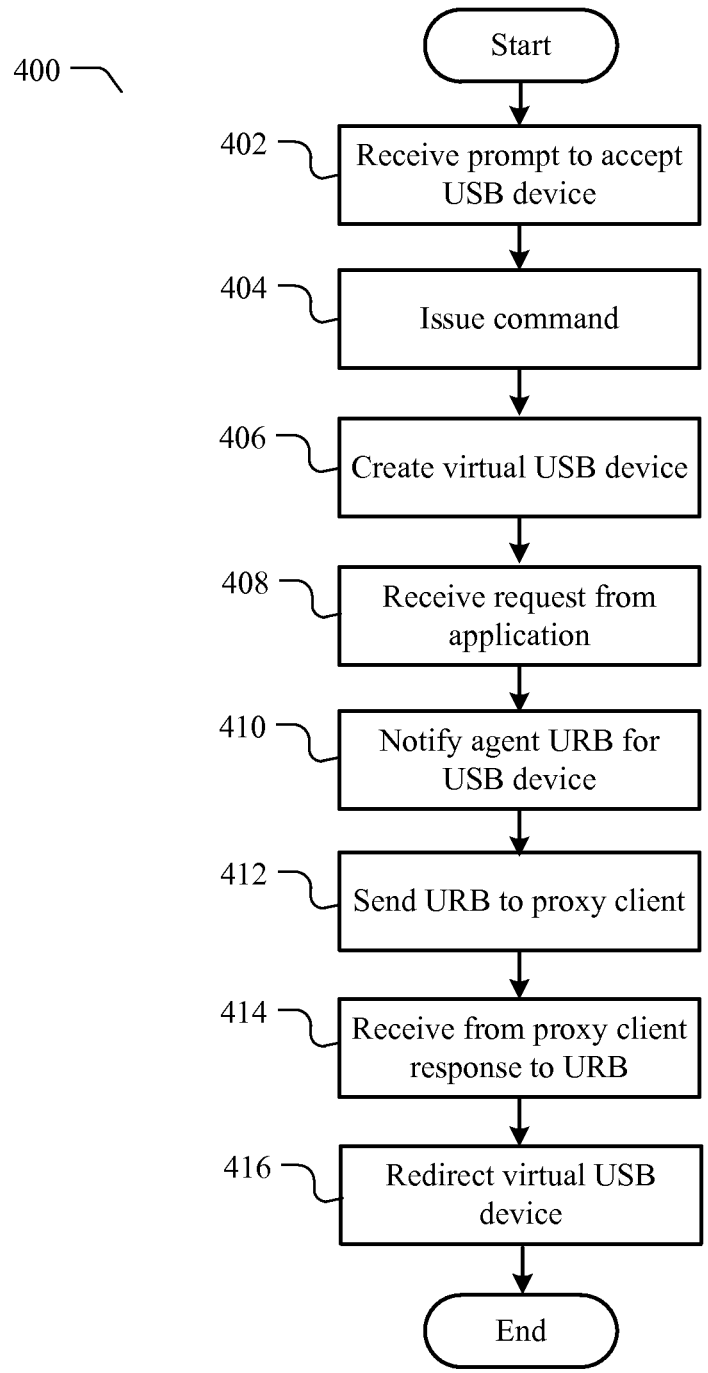
FIG. 4 illustrates an example of steps involved in one method according to one embodiment of the present disclosure.

FIG. 4 is a flow chart in accordance with one embodiment of the present invention shown generally at 400. At step 402, the server 140 receives a notification from a client 120 that a USB device 130 is ready for virtualization. The notification is sent from the proxy client 206 to the agent 224. In one embodiment, the notification is a USB device 130 arrival notification. In one embodiment, the notification may prompt the server 140 to accept redirection of the USB device 130.

At step 404, the agent 224 issues a command to a virtual disk enumerator (not shown) to create a virtual USB device 150 corresponding to USB device 130. The virtual USB device 150 may be created based, at least in part, on any one or more properties of the USB device 130 associated with the notification. At step 406, the virtual USB device 150 is created. The virtual USB device 150 may notify the operating system of the server 140 that the virtual USB device 150 has arrived. The operating system builds an associated driver stack and will identify and load the required drivers for the virtual USB device 150. Virtual USB device 150 is now accessible to any user of the remote conference.

At step 408, an application 230 may send a request (or a URB) to the server 140 to redirect the USB device 130 associated with the virtual USB device 150 to one or more clients 120. The request may comprise information associated with the virtual USB device 150 (that corresponds to USB device 130), selection of one or more attendees, selection of one or more clients, any other suitable information known to one of ordinary skill in the art, or any combination thereof. In one embodiment, the virtual USB device receives the request from an upper driver stack that corresponds to the USB device 130. At step 410, the virtual USB device 150 sends a notification to agent 224 where the notification is indicative of a request for redirection of a USB device 130 that corresponds to virtual USB device 150. For example, the notification may comprise a request to redirect the virtual USB device 150 selected for redirection by the host or another attendee. The request may include one or more parameters that indicate one or more selected clients 120, one or more selected attendees, or any other suitable parameter known to one of ordinary skill in the art associated with the request for redirection. At step 412, the agent 224 sends the request to the proxy client 206.

At step 414, the agent 224 receives from the proxy client 206 a response indicative of a status of the USB device 130 associated with the selected USB device 150. For example, the status may indicate that the USB device 130 associated with the selected virtual USB device 150 may be redirected to the selected one or more clients or the one or more attendees associated with the request. In another example, the status may indicate that the USB device 130 associated with the selected virtual USB device 150 may not be redirected to the one or more clients associated with the request, or to the one or more attendees associated with the request, or any combination thereof. In one embodiment, the response may indicate that the virtual USB device 150 may be redirected to only a subset or selection of the one or more clients or the one or more attendees. The client 120 associated with the USB device 130 may restrict access to certain attendees and may do so via the response to a request to redirect the selected virtual USB device associated with the USB device 130. At step 416, the server based, at least in part, on the response redirects the virtual USB device 150 to the selected one or more clients 120, the selected one or more attendees or any combination thereof.

Figure 5:
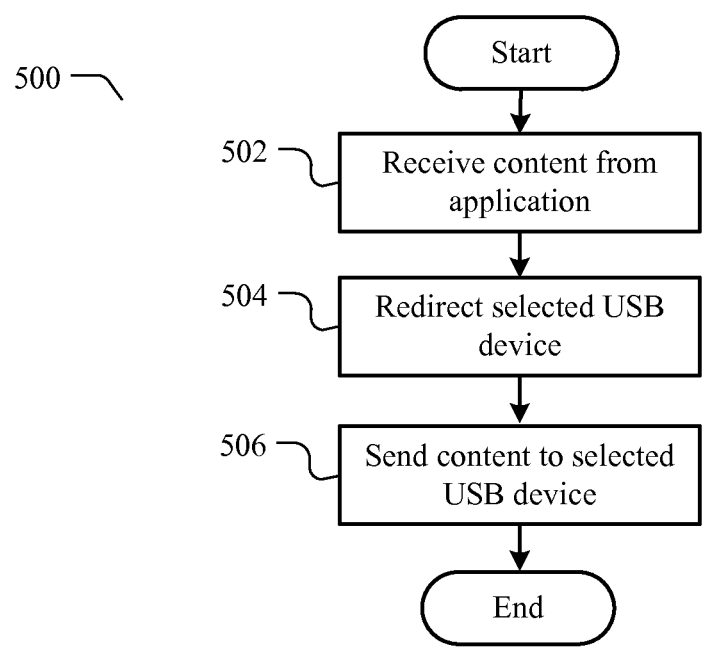
FIG. 5 illustrates transaction requests between a client and server according to one embodiment of the present disclosure.

FIG. 5 is a flow chart in accordance with one embodiment of the present invention shown generally at 500. At step 502, server 140 receives content from an application 230 associated with a conference. In one embodiment the application 230 is local to the server while in another embodiment application 230 is a virtual application. In a particular embodiment, the content is from an input to or data accessed by the application 120, a USB device 130 coupled locally to the server 140 or a virtual USB device 150 accessed by a remote conferencing application, such as UCS and web conferencing software used for online meetings, presentations, training sessions, and collaboration in an enterprise environment. In one embodiment, the application 230 receives the content from a corresponding application at a client 120 associated with an attendee. For example, one or more attendees may request to backup data associated with the conference and may communicate that content (the backup data, for example) to server 140. For example, the one or more attendees may request that content be stored at selected USB device 130 that has been redirected to each of the one or more attendees.

At step 504, the server 140 receives a request from the one or more clients (associated with one or more attendees) to redirect a selected USB device 130, for example, the USB device 130 associated with the virtual USB device 150. The request may comprise identification of the selected USB device 130, identification of the selected one or more attendees, identification of the one or more clients associated with the one or more selected attendees, any other suitable information known to one of ordinary skill in the art, or any combination thereof. For example, the one or more attendees may want to print a hard copy of certain content associated with the conference. The one or more attendees associated with the one or more clients 120 may select a USB device 130, for example, a USB printer, associated with a client 120. In one embodiment, the same USB device 130 may be selected by all attendees. In another embodiment, each attendee may select any one or more available USB devices. For example, each attendee may select a USB printer within close proximity to the individual attendee. In another example, a collection of printed signature may be required by the host and a selected USB device 130 capable of receiving print commands from each of the selected attendees may be redirected to the selected attendees. The selected attendees may then send each respective signature to the redirected USB device 130. The selected USB device 130 may correspond to a virtual USB device 150. The one or more clients communicate the selected virtual USB device 150 associated with the USB device 130 to the server 140.

At step 506, the content is communicated via server 140 to the selected USB device 130 that corresponds to a virtual USB device 150. For example, the selected USB device 130 that has been redirected to one or more clients 120 via server 140 may be a USB printer and the one or more clients 120 that sent the request may indicate that the content should be printed at the selected USB device 130. In another embodiment, the selected USB device 130 that corresponds to a virtual USB device 150 is a USB mass storage device and one or more attendees (that may include the host) associated with the one or more clients 120 request that certain content be stored at the selected USB device 130. In one embodiment, any one or more of the attendees may redirect any one or more of the available USB devices 130 that correspond to a virtual USB device 150 to any one or more of the other attendees via server 140.

In one embodiment, one or more attendees may request that a selected USB device 130 that corresponds to a virtual USB device 150 be redirected to one or more clients 120 prior to sending the content to the server 140. For example, one or more attendees may request that a signature pad be redirected to one or more attendees at one or more clients 120 such that the attendees associated with the one or more clients 120 may record a signature. The signatures from each of the selected one or more attendees is communicated and collected at the server 140. The server 140 may then communicate the content (the signatures) to a selection of the selected attendees at any one or more clients 120 or to one or more selected clients 120. In one embodiment, the host may make a selection of the one or more attendees to communication the content to from a list of the one or more attendees based, at least in part, on one or more parameters associated with the one or more attendees. For example, the host may permit the content to be communicated to only those attendees with certain permissions or access rights, to attendees at selected clients 120, to attendees associated with clients 120 that have certain network permissions, bandwidth, configurations, etc., or any other parameters known to one of ordinary skill in the art.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an I/O interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard-disk drive (HDD), a floppy disk drive, flash memory, an optical disc, a magneto-optical disc, magnetic tape, or a USB drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    initiating a conference via an application, wherein the conference is joined by one or more attendees;

receiving a virtualization request to virtualize one or more universal serial bus (USB) devices from a client associated with at least one of the one or more attendees for use by the application;

creating one or more virtual USB devices associated with the one or more USB devices;

receiving a redirection request from the application to redirect a selected virtual USB device to one or more clients associated with one or more selected attendees of the one or more attendees, wherein the redirection request comprises information associated with the selected virtual USB device and the one or more selected attendees, wherein the selected virtual USB device corresponds to at least one of the one or more virtual USB devices;

sending a notification, from the selected virtual USB device, to an agent running on the server, wherein the notification comprises a request for redirection of the selected virtual USB device to one or more clients, wherein the one or more clients are associated with the one or more attendees;

sending over a websocket the redirection request to a proxy client of the client associated with the USB device that corresponds to the selected virtual USB device;

receiving from the proxy client a response, wherein the response is indicative of a status of the USB device associated with the selected virtual USB device, and wherein the status indicates one of that a USB device associated with the selected virtual USB device is redirectable to the one or more clients, that the USB device associated with the selected virtual USB device is not redirectable to the one or more clients, or that the USB device associated with the selected virtual USB device is redirectable to a subset of the one or more clients; and redirecting the selected virtual USB device to the one or more clients associated with the one or more selected attendees based, at least in part, on the response.

2. The method of claim 1, wherein the redirection request comprises identification of one or more selected attendees.

3. The method of claim 1, wherein the response indicates one or more attendees that have access to the USB device associated with the selected virtual USB device.

4. The method of claim 1, further comprising:
receiving content from at least one of the one or more attendees; and
storing the content on the selected virtual USB device.

5. The method of claim 1, further comprising:
collecting content from at least one of the one or more attendees; and
communicating the collected content to a selection of the one or more attendees.

6. The method of claim 5, wherein the selection of the one or more attendees is made by the host based, at least in part, on one or more parameters.

7. The method of claim 6, wherein the one or more parameters comprise permissions associated with the one or more attendees.

8. A system comprising:
a server;
one or more central processing units for processing information of the server;
a memory of the server communicatively coupled to the one or more central processing units; and
one or more modules that comprise instructions stored in the memory, the instructions, when executed by the one or more processing units, operable to perform operations comprising:
initiating a conference via an application, wherein the conference is joined by one or more attendees;
receiving a virtualization request to virtualize one or more universal serial bus (USB) devices from a client associated with at least one of the one or more attendees for use by the application;
creating one or more virtual USB devices associated with the one or more USB devices;
receiving a redirection request from the application to redirect a selected virtual USB device to one or more clients associated with one or more selected attendees of the one or more attendees, wherein the redirection request comprises information associated with the selected virtual USB device and the one or more selected attendees, and wherein the selected virtual USB device corresponds to at least one of the one or more virtual USB devices;
sending a notification, from the selected virtual USB device, to an agent running on the server, wherein the notification comprises a request for redirection of the selected virtual USB device to one or more clients, wherein the one or more clients are associated with the one or more attendees;
sending over a websocket the redirection request to a proxy client of the client associated with the USB device that corresponds to the selected virtual USB device;
receiving from the proxy client a response, wherein the response is indicative of a status of the USB device associated with the selected virtual USB device, and wherein the status indicates one of that a USB device associated with the selected virtual USB device is redirectable to the one or more clients, that the USB device associated with the selected virtual USB device is not redirectable to the one or more clients, or that the USB device associated with the selected virtual USB device is redirectable to a subset of the one or more clients; and
redirecting the selected virtual USB device to the one or more clients associated with the one or more selected attendees based, at least in part, on the response.

9. The system of claim 8, wherein the redirection request comprises identification of one or more selected attendees.

10. The system of claim 9, wherein the response indicates one or more attendees that have access to the USB device associated with the selected virtual USB device.

11. The system of claim 8, wherein the instructions, when executed by the one or more processing units, further operable to perform operations comprising:
receiving content from at least one of the one or more attendees; and
storing the content on the selected virtual USB device.

12. The system of claim 8, wherein the instructions, when executed by the one or more processing units, operable to perform operations comprising:
collecting content from at least one of the one or more attendees; and
communicating the collected content to a selection of the one or more attendees.

13. The system of claim 12, wherein the selection of the one or more attendees is made by the host based, at least in part, on one or more parameters.

14. The system of claim 13, wherein the one or more parameters comprise permissions associated with the one or more attendees.

15. One or more computer-readable non-transitory storage media embodying software operable when executed by one or more computer systems to:
 initiate a conference via an application, wherein the conference is joined by one or more attendees;
 receive a virtualization request to virtualize one or more universal serial bus (USB) devices from a client associated with at least one of the one or more attendees for use by the application;
 create one or more virtual USB devices associated with the one or more USB devices;
 receive a redirection request from the application to redirect a selected virtual USB device to one or more clients associated with one or more selected attendees of the one or more attendees, wherein the redirection request comprises information associated with the selected virtual USB device and the one or more selected attendees, and wherein the selected virtual USB device corresponds to at least one of the one or more virtual USB devices;
 send a notification from the selected virtual USB device, to an agent running on the server, wherein the notification comprises a request for redirection of the selected virtual USB device to one or more clients, wherein the one or more clients are associated with the one or more attendees;
 send over a websocket the redirection request to a proxy client of the client associated with the USB device that corresponds to the selected virtual USB device;
 receive from the proxy client a response, wherein the response is indicative of a status of the USB device associated with the selected virtual USB device, and wherein the status indicates one of that a USB device associated with the selected virtual USB device is redirectable to the one or more clients, that the USB device associated with the selected virtual USB device is not redirectable to the one or more clients, or that the USB device associated with the selected virtual USB device is redirectable to a subset of the one or more clients; and
 redirect the selected virtual USB device to the one or more clients associated with the one or more selected attendees based, at least in part, on the response.

16. The media of claim 15, wherein the redirection request comprises identification of one or more selected attendees.

17. The media of claim 15, wherein the response indicates one or more attendees that have access to the USB device associated with the selected virtual USB device.

18. The media of claim 15, wherein the software is further operable when executed to:
 receive content from at least one of the one or more attendees; and
 store the content on the selected virtual USB device.

19. The media of claim 15, wherein the software is further operable when executed to:
 collect content from at least one of the one or more attendees; and
 communicate the collected content to a selection of the one or more attendees.

20. The media of claim 19, wherein the selection of the one or more attendees is made by the host based, at least in part, on one or more parameters, and wherein the one or more parameters comprise permissions associated with the one or more attendees.

* * * * *